July 2, 1935.  J. S. GREGORIUS  2,006,352
APPARATUS FOR WINDOW GLASS
Filed June 29, 1932  3 Sheets-Sheet 1

INVENTOR.
Joseph S. Gregorius
by
Bradley & Bee
attys

July 2, 1935.  J. S. GREGORIUS  2,006,352
APPARATUS FOR WINDOW GLASS
Filed June 29, 1932  3 Sheets-Sheet 2
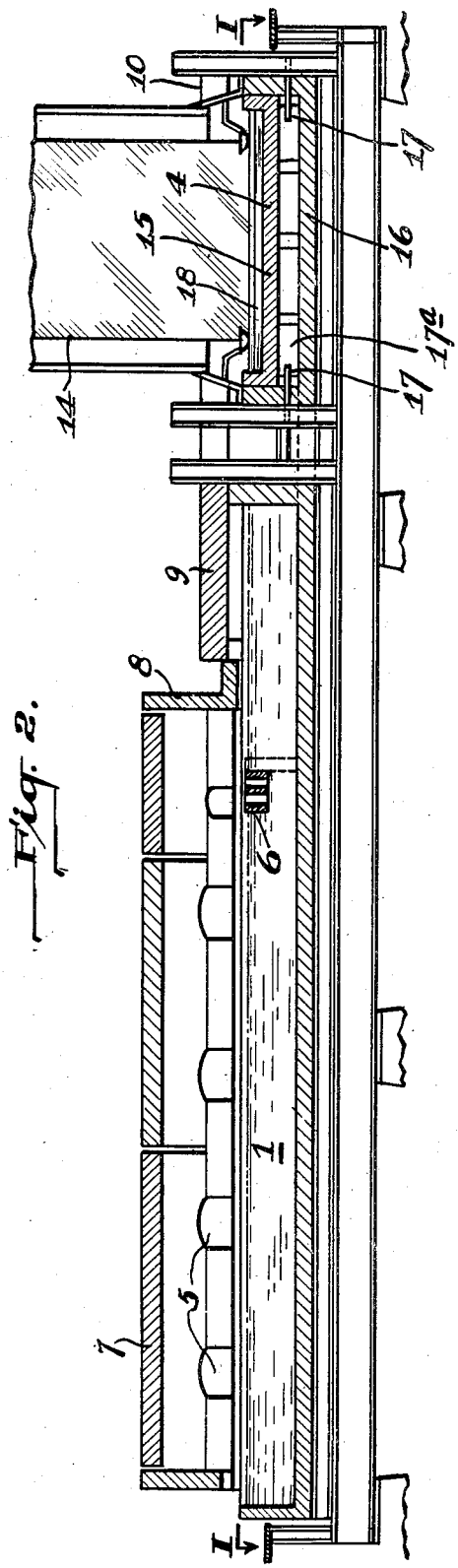
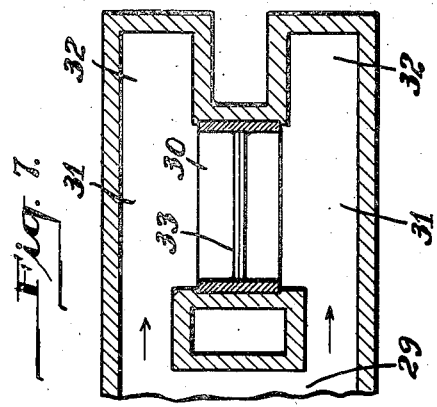
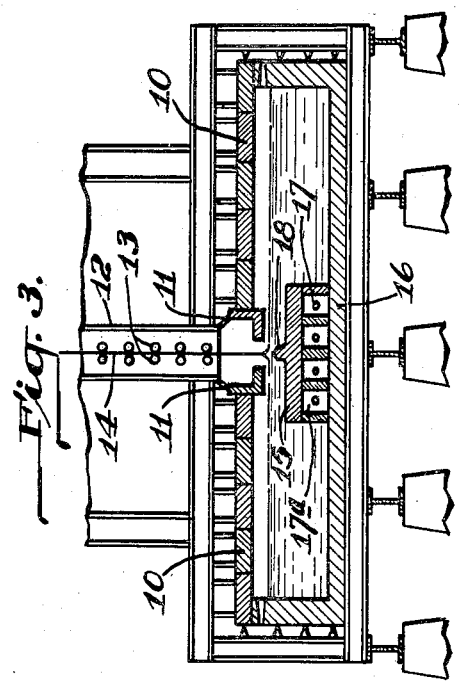
INVENTOR
Joseph S. Gregorius
by
Bradley & Bee
attys July 2, 1935.  J. S. GREGORIUS  2,006,352
APPARATUS FOR WINDOW GLASS
Filed June 29, 1932  3 Sheets-Sheet 3

INVENTOR
Joseph S. Gregorius
by
Bradley & Bee

Patented July 2, 1935

2,006,352

UNITED STATES PATENT OFFICE 2,006,352

APPARATUS FOR WINDOW GLASS

Joseph S. Gregorius, Tarentum, Pa., assignor to Pittsburgh Plate Glass Company, a corporation of Pennsylvania Application June 29, 1932, Serial No. 619,871

3 Claims. (Cl. 49—17)

Figure 1:
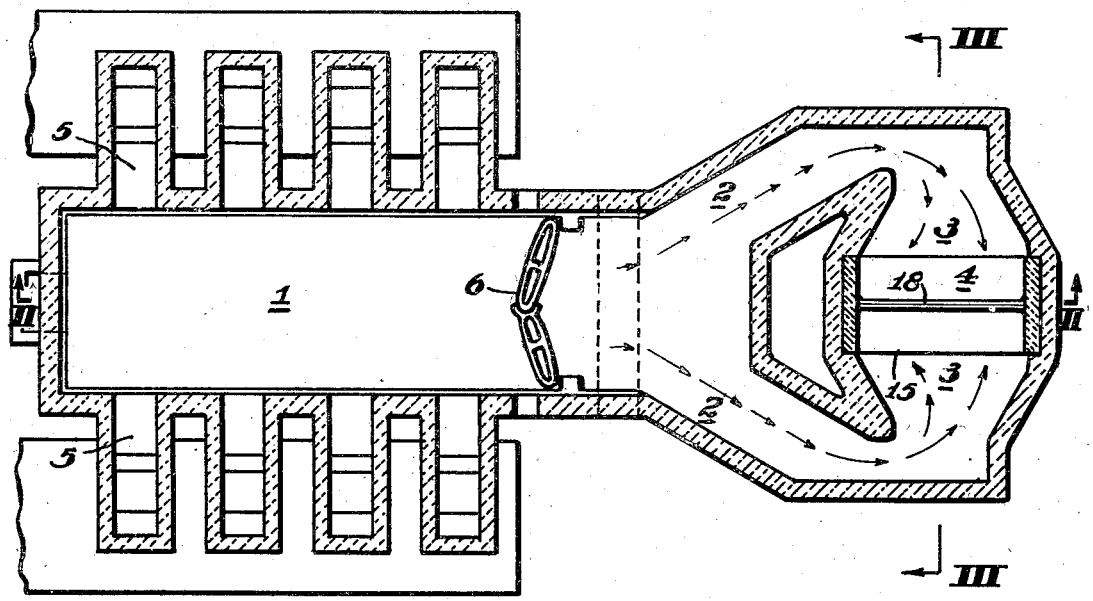
Figure 6:
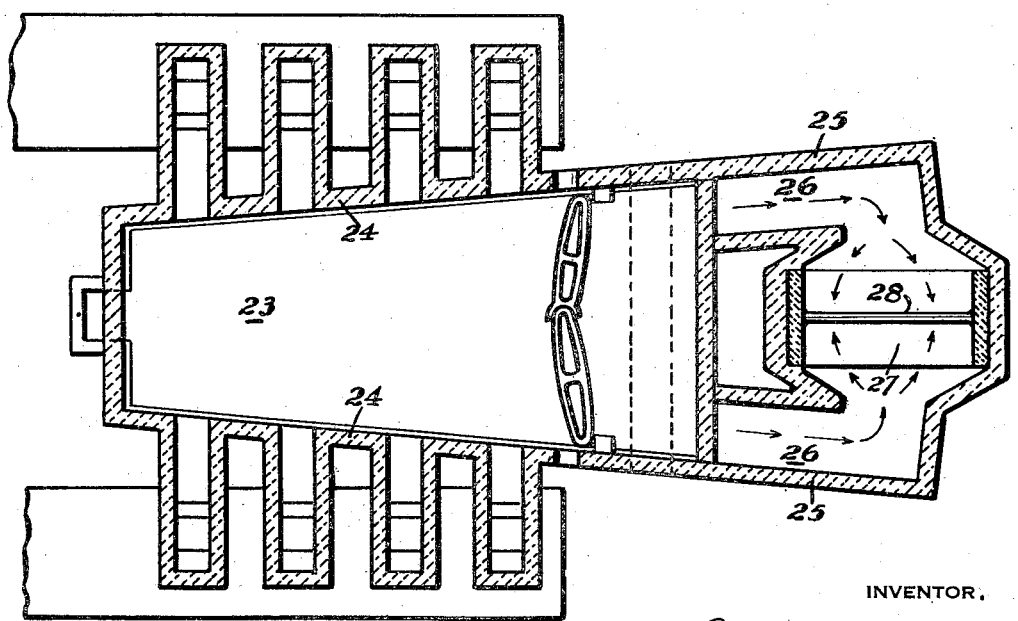
Figure 4:
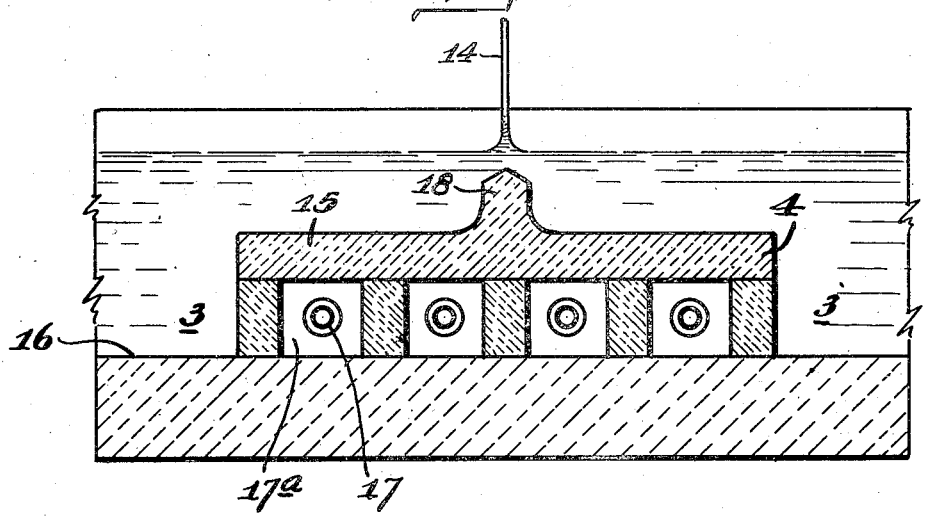
Figure 5:
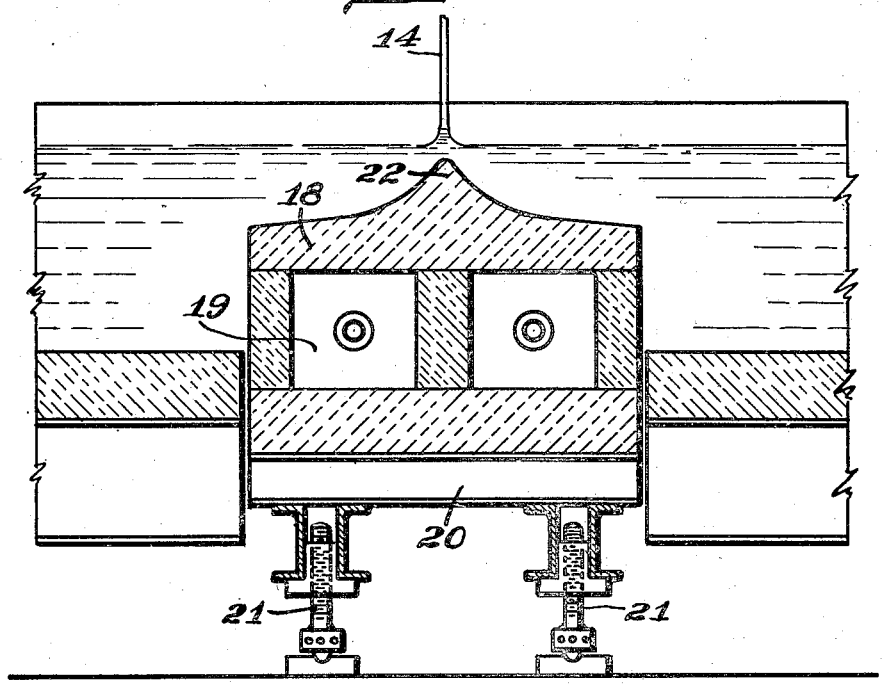

The invention relates to apparatus of the Slingluff type for making window or sheet glass and has for its objects the provision of a construction in which any tendency of the sheet to warp and break is reduced to a minimum, and the provision of an improved draw bar construction which will not sag or warp to any appreciable degree and which has a long period of life as compared with the type of draw bar heretofore employed. Briefly stated, these results are secured by using a draw bar which rests on the bottom of the draw pot or tank instead of being supported only at its ends and by supplying hot glass from the melting tank directly to both sides of the draw bar so that temperature conditions are regulated by the flow of hot glass are the same on both sides of the bar. Certain embodiments of the invention are illustrated in the accompanying drawings, wherein:

Figure 1 is a horizontal section through one type of construction on the line I—I of Fig. 2. Fig. 2 is a vertical section on the line II—II of Fig. 1. Fig. 3 is a vertical section on the line III—III of Fig. 1. Fig. 4 is a partial vertical section on an enlarged scale on the line III—III of Fig. 1. Fig. 5 is a view similar to Fig. 4 of a modification. And Fig. 6 is a view similar to that of Fig. 1 through a modification. And Fig. 7 shows another modification.

Referring to the construction of Figs. 1, 2 and 3, 1 is a melting tank; 2, 2 are a pair of conduits leading from the front end of the melting tank with their extreme forward ends 3, 3 turned towards each other; and 4 is a draw pot lying between the ends 3, 3 of the conduits. The melting tank may be of any approved type having the usual regenerative heating system, including the ports 5 and provided with a floater 6. This tank has the usual curved top arch 7 and a drop arch 8 at the front end of the tank where it discharges into the conduits 2, 2. The conduits 2, 2 are provided with the cover members 9, 10 (Figs. 2 and 3), the cover members 10 also extending over the ends of the draw pot. A pair of L-shaped blocks 11, 11 also serve to partially cover the draw pot, as indicated in Fig. 3.

Positioned above the draw pot is a sheet drawing apparatus comprising the vertical leer casing 12 (Fig. 3), in which are located a series of pairs of drawing rolls 13 which are suitably driven. The glass sheet 14 is carried up through this leer casing as is well-known in the art and the sections or sheets are severed at the top of the casing and carried away.

The draw pot is constructed, as indicated in Fig. 4, with a bottom plate 15 which lies above the level of the bottom plate 16 at the ends 3, 3 of the glass supply conduits. The combustion flues 16 provided with burners 17 extend beneath the plate 15 and provide a means for maintaining the shallow body of glass in the draw pot at the necessary temperature for drawing. Also extending transversely of the draw pot at the center thereof is the draw bar 18, whose upper edge lies beneath the surface of the glass and serves to position the line of draw of the sheet 14 and prevent such sheet from changing its position. This draw bar will not sag or warp and has a much longer period of life than a draw bar of the ordinary type which is supported only at its ends with a body of glass lying therebeneath. As the heating conditions on the two sides of the base of the sheet are substantially the same, there is no tendency of the sheet to warp and any breaking in the leer incident to such warping is, therefore, reduced to a minimum.

Fig. 5 illustrates a modification in which the bottom plate 18 of the draw pot is adjustable vertically together with the combustion chambers 19. This is accomplished by mounting the clay work upon the metal frame 20 which is carried by the jacks 21. The draw bar in this case is shaped as indicated at 22. This construction permits the floor of the draw pot and the draw bar to be adjusted to meet requirements and to compensate for any changes in the glass level.

Fig. 6 illustrates another modification in which the tank 23 has its side walls 24, 24 inclined away from each other from the rear to the front end of the tank with the side walls 25, 25 of the conduits 26, 26 also correspondingly inclined. The conduits 26, 26 have their ends turned toward each other as in the other types of construction, such ends directing the glass into the draw pot 27 which is provided with a draw bar 28 similar to that shown in Figs. 3 and 4. This arrangement simplifies the tank construction and reduces the frictional resistance to the forward movement of the glass.

Fig. 7 illustrates a modification in which the glass from the melting tank 29 is delivered to the draw pot 30 for its entire span. In this construction the conduits 31, 31 continue beyond the draw pot, as indicated at 32, 32 for the purpose of protecting the glass entering the draw pot from end-wall heat loss and to permit convection current movements to have full play in freshening the glass flowing into the pot. The draw bar is similar to the one shown in Fig. 4. The draw bar 33 is shown in the various modifications as integral with the bottom of the draw pot and this is the preferred construction although the invention is not limited in this particular. The phrase "on the floor", as applied to the draw bar, is therefore intended to cover any arrangement in which the bar receives its support from the floor structure either as a part of such floor structure or due to contact therewith.

What I claim is:

1. In combination, a melting tank, a pair of conduits at the front end of the tank spaced apart and constituting extensions of the tank, a draw pot lying between the conduits with its ends communicating with the sides of the conduits, and a draw bar extending transversely of the pot on the floor thereof, said conduits being extended forward past the front end of the draw pot.

2. In combination, a melting tank comprising a body portion with heating ports through its side walls, a pair of conduits at the front end of said body portion spaced apart and communicating directly with the body portion so that they constitute extensions thereof which are of substantially the same depth as the body portion, a draw pot lying between the conduits with its ends communicating with the inner sides of the conduits, and with its bottom above the bottoms of the conduits, heating means beneath the pot, and a draw bar extending transversely of the draw pot on the bottom thereof.

3. In combination, a melting tank comprising an elongated body portion with heating ports in its side walls, a pair of conduits at the front end of said body portion spaced apart and with their outer side walls constituting extensions of the side walls of the body portion in substantial alignment therewith, said conduits being of substantially the same depth as said body portion of the tank, a draw pot lying between the conduits with its ends communicating with the inner sides of the conduits, and with its bottom above the bottoms of the conduits, heating means beneath the pot, and a draw bar extending transversely of the draw pot on the bottom thereof.

JOSEPH S. GREGORIUS.